United States Patent [19]

Idelson

[11] 4,267,253
[45] May 12, 1981

[54] CHROME COMPLEXED MAGENTA DYE DEVELOPERS

[75] Inventor: Elbert M. Idelson, West Newton, Mass.

[73] Assignee: Polaroid Corporation, Cambridge, Mass.

[21] Appl. No.: 132,549

[22] Filed: Mar. 21, 1980

Related U.S. Application Data

[63] Continuation-in-part of Ser. No. 1,450, Jan. 8, 1979, abandoned.

[51] Int. Cl.³ .......................... G03C 1/40; G03C 1/10
[52] U.S. Cl. ..................................... 430/225; 430/562
[58] Field of Search ........................ 430/225, 243, 562

[56] References Cited

U.S. PATENT DOCUMENTS

| | | | |
|---|---|---|---|
| 3,544,545 | 12/1970 | Idelson | 430/225 |
| 3,551,406 | 12/1970 | Idelson | 430/225 |
| 3,879,336 | 4/1975 | Maeda et al. | 260/37 N |
| 4,033,942 | 7/1977 | Beffa et al. | 260/145 A |
| 4,174,221 | 11/1979 | Idelson | 430/225 |

OTHER PUBLICATIONS

Martell et al., *Chemistry of the Metal Chelate Compounds*, Prentice-Hall, N.Y., 1956, pp. 534, 535, 548–551.

*Primary Examiner*—Richard L. Schilling
*Attorney, Agent, or Firm*—Gaetano D. Maccarone

[57] ABSTRACT

There are described novel magenta 1:1 chrome-complexed dye developers which are particularly useful in photographic products and processes. These novel magenta dye developers are ionic salts which include a cation and a colorless ligand which is a radical of an iminodiacetic acid.

22 Claims, 2 Drawing Figures

CHROME COMPLEXED MAGENTA DYE DEVELOPERS

CROSS-REFERENCE TO RELATED APPLICATIONS

This application is a continuation-in-part application of prior copending application Ser. No. 001,450, filed Jan. 8, 1979 and now abandoned.

BACKGROUND OF THE INVENTION

This invention is directed to novel dye developers which are useful in photographic products and processes and more particularly to novel magenta chrome-complexed dye developers.

Metal-complexed dyes are well known in the art. One group of metal-complexed dyes are those referred to in the art as 1:1 complexes, a term embracing complexes of one dye molecule complexed to a metal ion. Metal-complexed dyes having a silver halide developing capability, i.e., metal-complexed dye developers are also well known in the art. Such dye developers are described, for example, in U.S. Pat. No. 3,551,406 and may be illustrated schematically as follows:

Dye-Me-Ligand-Developer wherein "Dye" is a chelatable o complexable dye, "Me" is a metal-complexing atom, "Ligand" is a substantially colorless ligand which contributes at least one preferably two of the coordinating or donor atoms necessary to form the desired complex, and "Developer" is a silver halide developing agent or substituent. It is also known in the art that the developing function in dye developers may be contained on the ligand or on the dye. Many dye developers which are within the class illustrated above have been disclosed in the art. Nevertheless, as the art of photography advances and more stringent demands are imposed upon the materials used because of increased performance standards there continue to be discovered novel compositions of matter which are useful in the art. The present application relates to novel magenta chrome-complexed dye developers and their use in photographic products and processes.

PRIOR ART STATEMENT

U.S. Pat. No. 3,544,545 discloses 1:1 chrome-complexed azo dye developers which are useful in color photography. These dye developers include ligands, or compounds contributing two oxygen atoms bonded to the chromium atom, which may be defined as $\beta$-hydroxy-$\alpha,\beta$-unsubstituted carbonyl compounds, or compounds capable of tautomerizing to such a structure. U.S. Pat. No. 3,551,406 also discloses dye developers for use in color photography. It is disclosed that the ligand moiety may be selected from various groups of organic ligands including various amino acid compounds.

SUMMARY OF THE INVENTION

It is therefore the object of this invention to provide novel dye developer materials which are useful in photographic products and processes.

It is another object of the invention to provide photographic products and processes utilizing the novel dye developer materials.

It is a further object to provide novel magenta 1:1 chrome-complexed dye developers.

It is still another object to provide such dye developers which are ionic salts.

Still further it is an object to provide such dye developers which include a colorless ligand which is a radical of an iminodiacetic acid.

BRIEF SUMMARY OF THE INVENTION

These and other objects and advantages are accomplished in accordance with the invention by providing novel compounds which are magenta chrome-complexed dye developers and which include both the radical of an ortho, ortho' dihydroxyazo dye, and a colorless ligand which is a radical of an iminodiacetic acid coordinated to a chromium ion, and a cation. Since the chromium complexes of ortho, ortho'-dihydroxyazo dyes and iminodiacetic acids bear a single negative charge, a positive counterion is required to provide electrical neutrality. The novel dye developer compounds are represented by the structural formula:

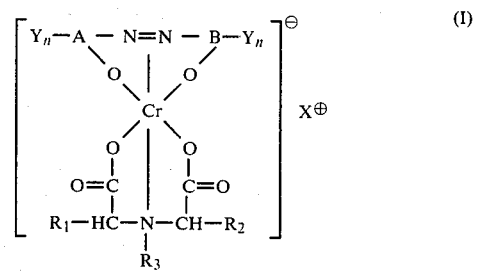

wherein

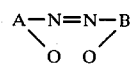

is the radical of an ortho, ortho'-dihydroxyazo dye represented by the structural formula

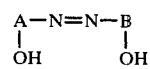

wherein A is an aromatic radical, for example, a radical of benzene or naphthalene; B is a aromatic or a nitrogen-containing heterocyclic radical, for example, a radical of benzene, naphthalene pyrazolone or pyrimidine; Y is a silver halide developing substituent, each n is 0, 1 or 2 with the proviso that at least one n is 1; X is a cation; $R_1$ and $R_2$ may be H or when taken together represent the carbon atom necessary to complete a five or six member heterocyclic moiety; and $R_3$ may be H or alkyl having from 1 to 6 carbon atoms.

For the present invention, a silver halide developing substituent (Y) is one containing a benzene or naphthalene nucleus containing at least a hydroxy and/or amino substituent ortho or para to another such substituent. Silver halide developing substituents of this type are well known to the art as evidenced, for example, by Neblette's Handbook of Photography and Reprography, 7th Edition, published by Van Nostrand Reinhold Company, Inc. (1977), pp. 115–118. A preferred group of developing substituents are the hydro-quinonyls, including substituted derivatives such as alkyl, phenyl and/or alkoxy substituted derivatives of hydroquinone.

In addition to the silver halide developing substituents, the benzene, naphthalene or heterocyclic nucleus may contain substituents linking the developing moiety to the azo dye moiety. Such linking substituents include amino phenyl alkyl-thio substituents such as disclosed in U.S. Pat. No. 3,009,958; amino alkyl-amino substituents such as disclosed in U.S. Pat. No. 3,002,997; amino phenyl alkyl substituents such as disclosed in U.S. Pat. No. 3,043,690; amino-alkyl substituents such as disclosed in U.S. Pat. No. 3,064,884; amino phenyl substituents such as disclosed in U.S. Pat. No. 3,142,564; amino phenoxy substituents such as disclosed in U.S. Pat. No. 3,061,434 as well as the various linking substituents disclosed in U.S. Pat. No. 3,255,001.

The positive counterion, X, is a photographically acceptable cation and may be any which will not impair photographic processing, i.e., impair the absorption characteristics of the dye moiety or impair the functionality of the chrome complex as a dye developer. The counterion may be a metal such as barium, lithium, or sodium; or $H_3O^+$; or an onium salt such as an ammonium, phosphonium or sulfonium salt. A preferred class of onium salts which may be used is represented by the formula $$N^{+}R_4R_5R_6R_7$$

wherein $R_4$, $R_5$, $R_6$ and $R_7$ may be H or alkyl having from 1 to 8 carbon atoms. Other onium salts which may be used include the ammonium or quaternary salts of heterocyclic bases, e.g., pyridinium or alkyl picolinium or of amines such as, for example, aniline.

As noted the ligand is a radical of an iminodiacetic acid which is represented by the structural formula

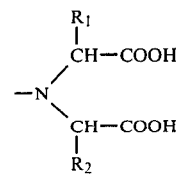

wherein $R_1$ and $R_2$ may be H or when taken together represent the carbon atoms necessary to complete a five or six member heterocyclic moiety. A preferred ligand of the latter type is a radical of an iminodiacetic acid which is represented by the structural formula

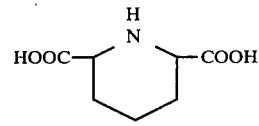

BRIEF DESCRIPTION OF THE DRAWINGS

For a better understanding of the invention as well as other objects and further features thereof, reference is made to the following detailed description of various preferred embodiments thereof taken in conjunction with the accompanying drawings wherein.

DESCRIPTION OF THE PREFERRED EMBODIMENTS

Specific magenta dye developers of the present invention are represented by the following structural formulas:

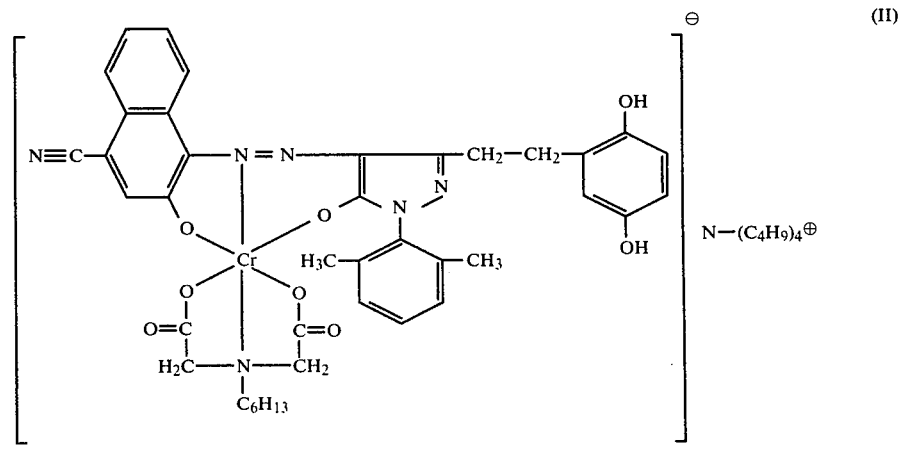

-continued
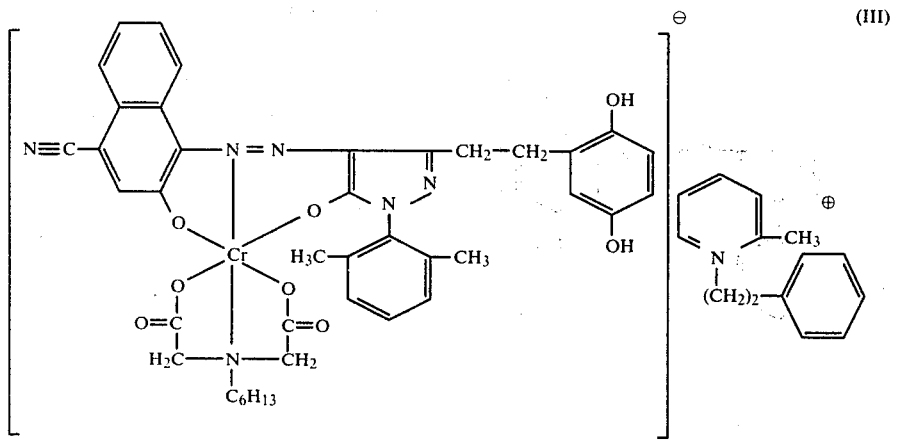
(III)
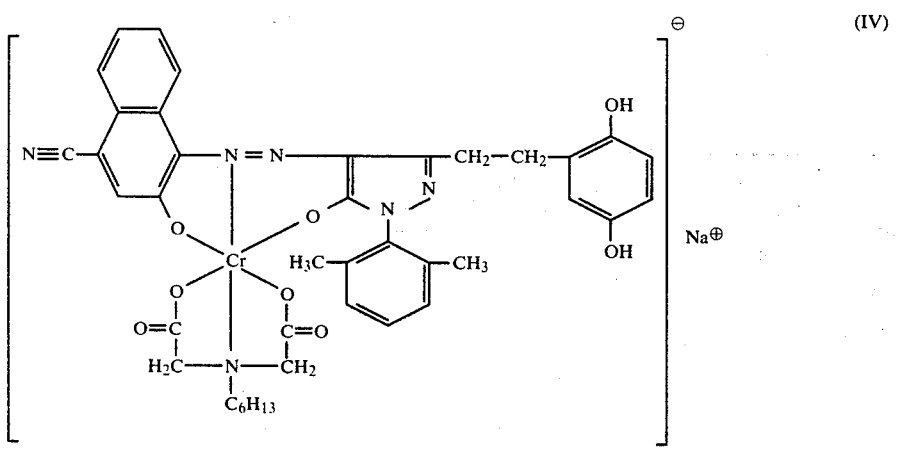
(IV)
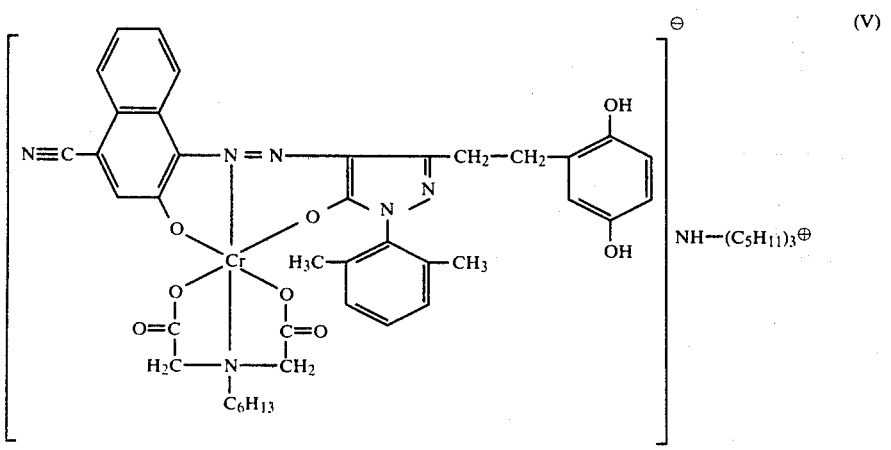
(V)

-continued
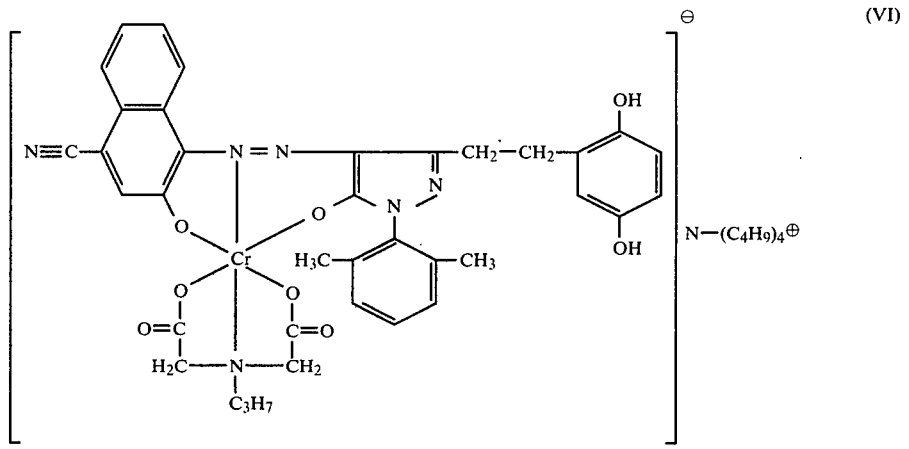
(VI)
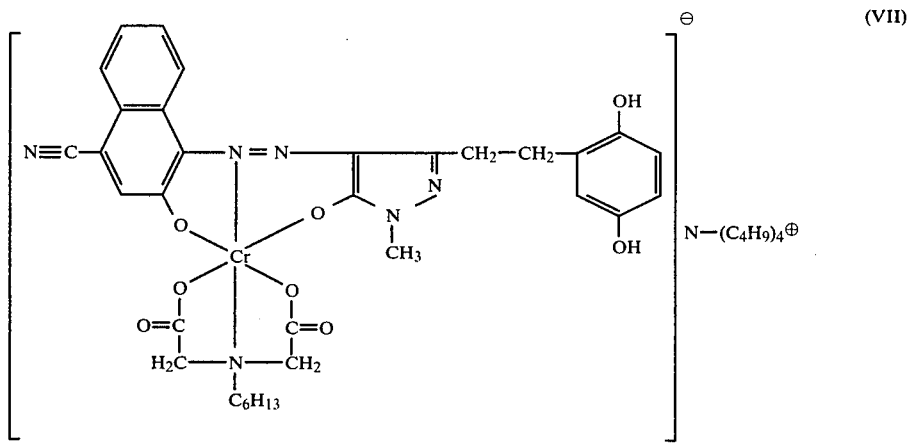
(VII)
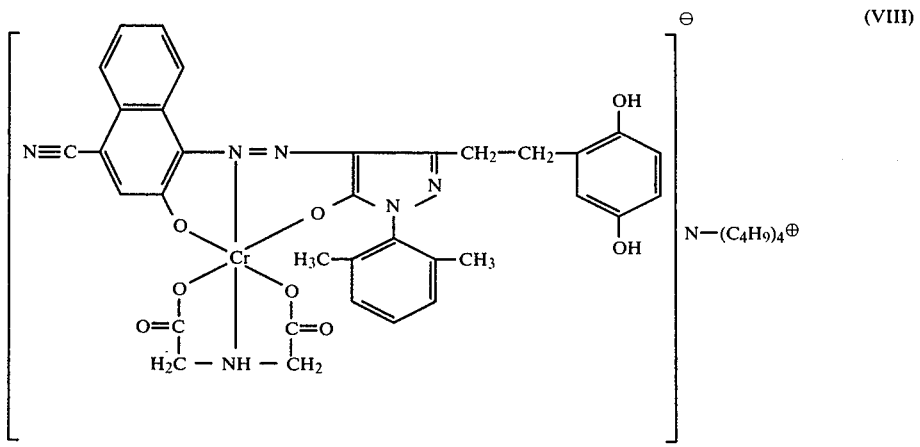
(VIII)

-continued

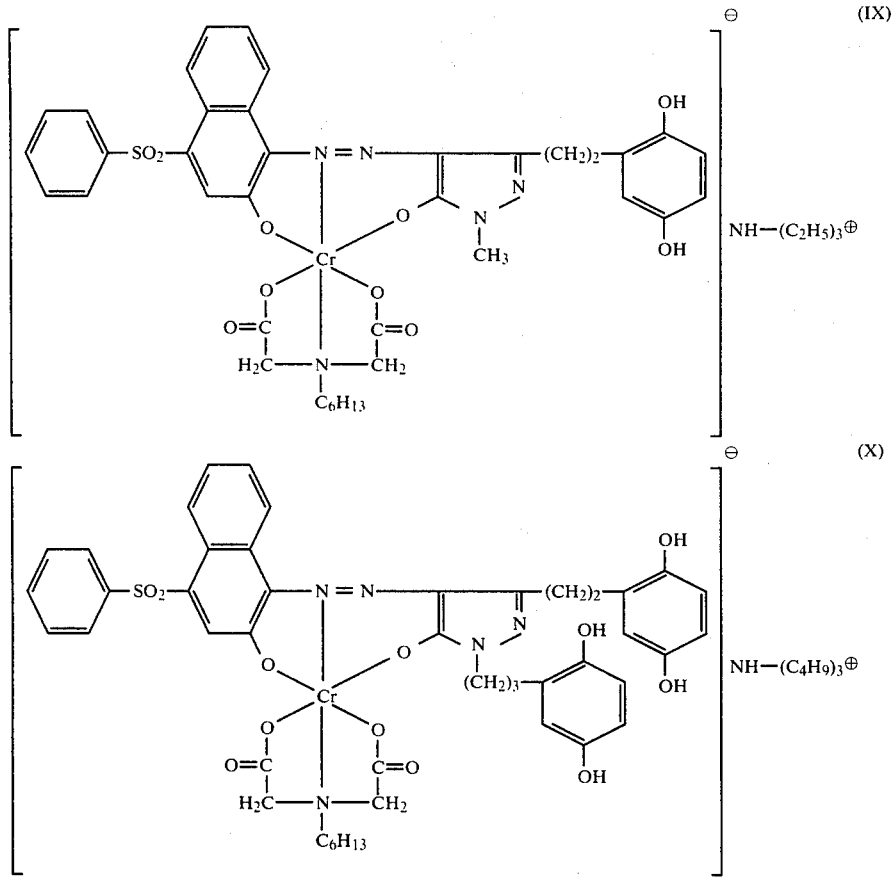

Figure 1:
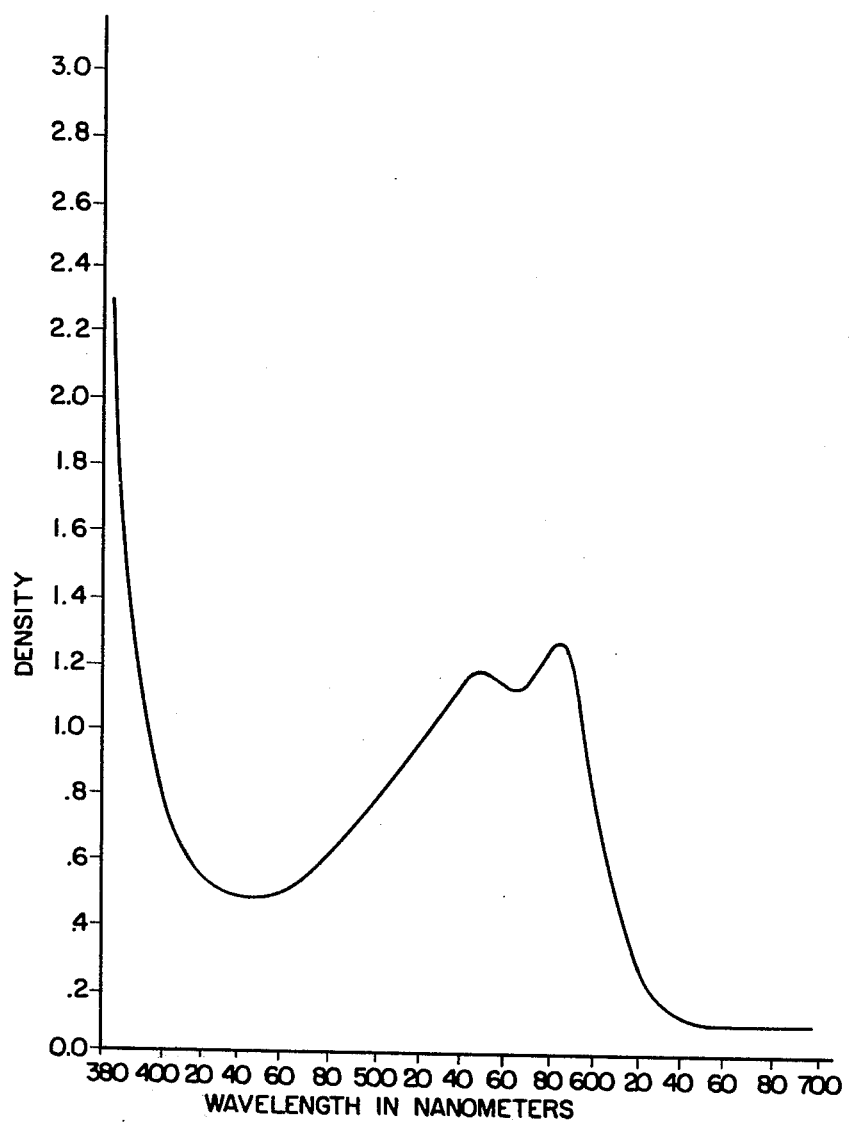
FIG. 1 is the reflection absorption spectrum of one of the preferred dye developers of the invention.

The preferred dye developers of the invention typically exhibit desirable absorption characteristics. FIG. 1 illustrates the reflection absorption spectrum of dye developer II. The preferred dye developers exhibit transmission characteristics in the blue region of the spectrum which provide brighter blues in the final photographic print. For monochromatic images made with film units including the preferred dye developers the ratio of the minimum density in the blue region to the maximum density in the green region is typically a relatively smaller value thus evidencing increased blue transmission.

As noted previously, the magenta 1:1 chrome-complexed dye developers include an ortho, ortho'-dihydroxyazo dye which is chrome complexed to a particular ligand. Thus, as mentioned previously, the dyes which are useful in the preparation of the novel dye developers of the invention may be represented by the general formula:

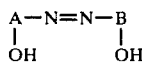

wherein A and B are as previously described. The dyes which correspond to the general formula may be prepared by techniques which are well known in the art and therefore extensive discussion of such techniques is not required. Generally the preparation of such azo dyes involves the diazotization of an aromatic ortho hydroxy amine and coupling of the diazotized amine by known techniques with an aromatic, heterocyclic or active methylene compound which can provide a second hydroxy group ortho to the azo linkage. Such couplers are known and include, for example, beta naphthols, pyrazolones and acetoacetanilides among The dye developer of the present invention includes one or more silver halide developer substituents which can be integrated with the dye portion. Suitable silver halide developing substituents for incorporation in the dye developers of the invention have been described previously. Details relating to such substituents and ways of integrating them in the dye developers can be found in various patents including U.S. Pat. Nos. 3,086,005; 3,134,762; 3,141,772; 3,236,643; 3,235,645; 3,252,990; 3,299,041. In some instances it may be desirable to employ a protected form of the silver halide developing substituent, i.e., where the hydroxy groups are replaced by acyloxy, benzyloxy, alkoxy or acetoxy substituents. These protected silver halide developing substituents can be connected to and removed from the dihydroxyphenyl developing substituents by known techniques.

Chrome complexing of the dye moieties or dye developer moieties of the 1:1 chrome-complexed magenta dye developers of the invention can be carried out according to known procedures including those described in U.S. Pat. No. 2,028,981. Generally, a chrome salt is reacted with an ortho, ortho'-dihydroxy azo dye or dye developer to form the 1:1 complex having a silver halide developing capability. The ligand is then attached to the chrome complex.

Figure 2:
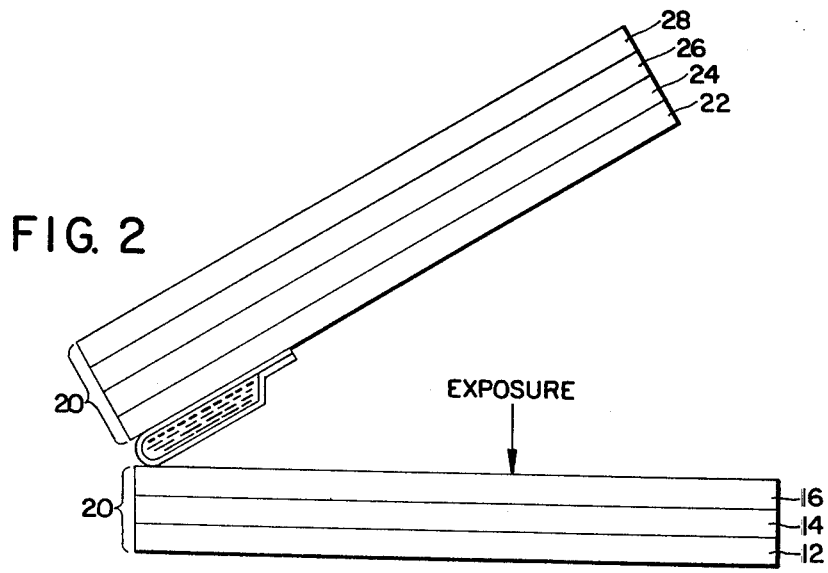
FIG. 2 is a partially schematic, cross-sectional view of one embodiment of a film unit according to the invention especially suited for the formation of a monochromatic image.

The dye developers of the present invention may be utilized in any film unit which is useful in monochromatic or multicolor photography. Particularly preferred film units according to the present invention are those diffusion transfer integral negative-positive film units of the type described in detail in U.S. Pat. Nos. 3,415,644 and 3,647,437. Other preferred film units are those which are designed to be separated after processing such as those which are described in U.S. Pat. No. 2,983,606. Extensive discussion of the film units of the invention is not required in view of the state of the art. However, for the purposes of illustration the invention will be further described with respect to a monochromatic film unit. Referring now to FIG. 2, there is seen the monochromatic film unit, generally designated which comprises a conventional paper or plastic film support 12, a layer 14 containing a magenta dye developer according to the invention, and a photosensitive layer 16 comprising a suitable silver halide emulsion. Container 18 includes a viscous processing reagent and may be formed of a composite sheet material comprising an inner layer which is substantially chemically inert to the processing reagent, an intermediate layer which is substantially impervious to vapor and an outer or backing layer which can be readily affixed to a layer of the film assembly such as, for example, the print receiving element 20. The print receiving element comprises a dyeable material and may comprise a single print receiving layer or a composite structure as shown, made up of image receiving layer 22, spacer layer 24, polymeric acid layer 26 and transparent support 28. In practice, the film unit is employed with any suitable photographic camera apparatus and is exposed to provide a negative latent image. Processing of the film unit is superposed relation with a portion of the print receiving element 20 while drawing these portions of the unit between a pair of pressure rollers which rupture container 18 and spread the processing composition contained thereon between and in contact with the photosensitive layer and the corresponding area of the print receiving element. The processing composition permeates or migrates into the photosensitive layer 16 and the dye developer layer 14. During the permeation of the processing composition into layer 14, dye developer contained in the layer is dissolved in the processing composition and is transported in solution into photosensitive layer 16 to distribute dye developer in the photosensitive layer. Where the dye developer interacts with exposed silver halide in layer 14 it is oxidized as a function of the amount of silver halide reduced to silver while the oxidation product of the dye developer forms an image that is substantially coextensive with the developed silver. The dye developer provides an oxidation product as a result of the silver development which is of considerably lower solubility in the processing composition than the dye developer itself. Under these conditions the oxidation product is substantially immobilized or retained in the photosensitive layer 16.

At the time that the dye developer is interacting with exposed silver halide and providing an immobile oxidation product an imagewise distribution of unoxidized dye developer is formed in the negative material in areas where exposure and subsequent development are less than complete. Dye developer present in solution in this imagewise distribution is transportable at least in part by imbibition to print receiving element 20. Thus, the print receiving element is dyed or otherwise colored by the transported dye developer where the dye developer is deposited to provide the desired reverse image in color of the latent image. In this instance the transfer or positive image is magenta. After formation of the positive image, the print receiving element is separated from the photosensitive element.

The invention will now be further described in detail with respect to specific preferred embodiments by way of examples, it being understood that these are intended to be illustrative only and the invention is not limited to the materials, conditions, process parameters, etc., recited therein. All parts and percentages are by weight unless otherwise specified.

EXAMPLE I

Preparation of Intermediates (A) A β-keto ester intermediate was prepared by the following reaction:

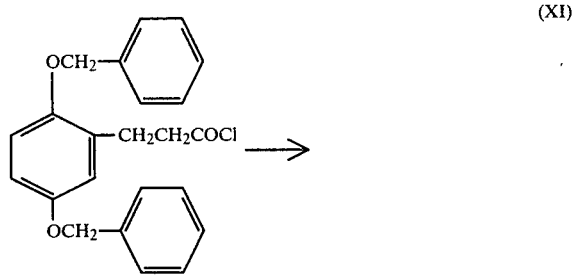

(XI)

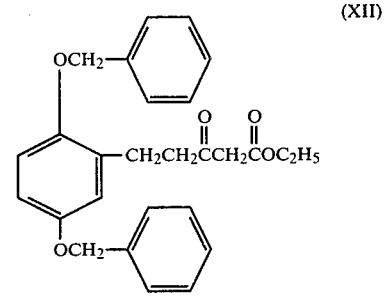

(XII)

Compound (XI) was prepared by initially adding 3-(2,5-dibenzyloxyphenyl) propionic acid (30 g; 0.083 mole) to a solution of oxalyl chloride (11.4 g; 0.09 mole) in benzene (300 ml) at room temperature. The solution was stirred under nitrogen for two hours and then evaporated in vacuo at 40° C. 200 ml of benzene were added and reevaporated under the same conditions described above to ensure complete removal of excess oxalyl chloride. Pumping on the residue at 0.1/mm for about one hour yielded 31.5 g of crude acid chloride which should be used immediately.

Compound (XII) was prepared by initially charging a flame dried, three neck, two liter round bottom flask equipped with a 500 ml pressure equalized addition funnel, an overhead stirrer and a nitrogen inlet with n-butyllithium (Alfa Inorganics 2.2 M in hexane; 114 ml, 0.25 mole) and dry tetrahydrofuran (100 ml). The solution was cooled to −10° C. and equilibrated over 10 minutes. Diisopropylamine (25.2 g; 34.5 ml; 0.25 mole) was added dropwise over a 20 minute period under nitrogen with stirring. The solution was stirred an additional 20 minutes at −10° C., cooled to −78° C. and allowed to equilibrate over 20 minutes. Ethyl acetate (predried over 4 Å sieves; 18 g; 20.1 ml; 0.25 mole) was added dropwise to the solution over a 15 minute period. The solution was stirred an additional 20 minutes at −78° C. A solution of compound (XI) (31.5 g; 0.083 mole) in 150 ml tetrahydrofuran was added to the flask at −78° C. over a 30 minute period. The solution was stirred an additional 10 minutes and then poured slowly and cautiously into 400 ml of saline solution. The mixture was extracted three times with 200 ml of ether, twice with 20 ml of 5% sodium bicarbonate solution, once with saline solution and then dried over calcium sulfate. The solvent was removed in vacuo to yield 35 g of a light yellow oil.

(B) a pyrazolone compound having the structural formula:

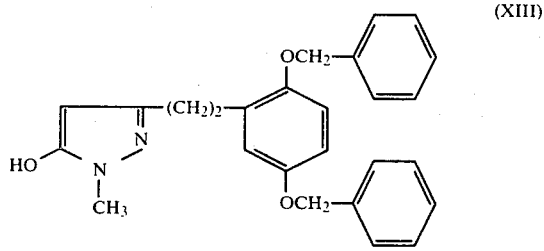

(XIII)

was prepared by initially combining 10.1 g (0.022 mole) of methylhydrazine and 95 g (0.022 mole) of compound (XII) in 250 ml of absolute ethanol at 0. C. The reaction mixture was stirred at ambient temperature overnight. The solid product was collected by filtration, rinsed with diethyl ether and air dried to yield 60 g of a white solid, m.p. 135°–136° C.

(C) A pyrazolone compound having the structural formula:

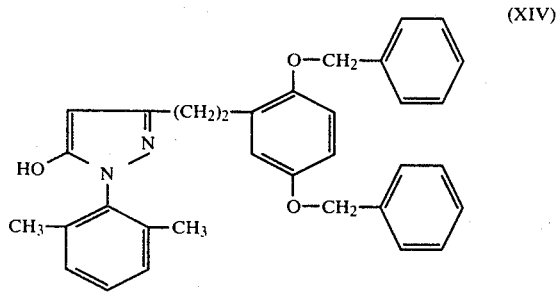

(XIV)

was prepared by initially forming a solution of 2.1 g (0.012 mole) of 2,6-dimethylphenylhydrazine hydrochloride and 1.48 g (0.018 mole) of sodium acetate in 15 ml of acetic acid and adding to it a solution of 6.5 g (0.015 mole) of compound (XII) in 5 ml of acetic acid. The resulting solution was kept at 50° C. overnight. The reaction mixture was diluted with about 1.5 liters of water and then extracted three times with 100 ml of ether. The ether extracts were washed successively with sodium bicarbonate solution, water, saturated salt solution and then dried over anhydrous magnesium sulfate. The ether was evaporated and the residue triturated with ethanol to yield 3.5 g of the pyrazolone, m.p. 157–158. C.

$C_{33}H_{32}N_2O_3$ requires 78.54% C; 6.39% H and 5.55% N. Elemental analysis of the compound found 78.4% C: 6.3% H and 5.5% N.

EXAMPLE II

Preparation of Compound II

There were combined 0.98 g (0.005 mole) of 4-cyan-1-diazo-2-naphthol, 2.5 g (0.005 mole) of compound (XIV) and 1 g (0.01 mole) of sodium carbonate in 300 ml of acetone and 10 ml of water at room temperature. The mixture was stirred for two hours and then quenched in 10% hydrochloric acid and ice. The solid was filtered, washed with water and dried to give 2.2 g of the blocked dye developer, m.p. 157°–159° C. $C_{44}H_{37}N_5O_4$ requires 75.52% C; 5.33% H; 10.01% N. Elemental analysis found 75.6% C; 5.4% H and 10.1% N.

A solution of 2.1 g (0.003 mole) of the previous product in 20 ml of methylene chloride was added dropwise to a stirred solution of 10 g of 30% HBr/HOAc in 60 ml of methylene chloride at room temperature. The solution was stirred or one hour. Hexane was added and the solid collected by filtration. Washing with water and recrystallization from 2-methoxyethanol gave 0.75 g of a red solid, m.p. 232°–233° C. (dec.). $C_{30}H_{25}N_5O_4$ requires 69.35% C; 4.85% H; 13.48% N and 12.32% O. Elemental analysis gave 69.1% C; 4.8% H; and 13.5% N.

There were combined 1.5 g (0.0029 mole) of the previous product and 1.6 g (0.006 mole) of chromium trichloride hexahydrate in 30 ml of 2-methoxyethanol. The solution was heated at 90° C. for 12 hours, then cooled and diluted with saturated sodium chloride solution and the product collected by filtration. The magenta solid was rinsed with water and air dried to yield 1.25 g of the 1:1 complex.

A ligand, N-hexyliminodiacetic acid, having the molecular formula $C_6H_{13}N(CH_2COOH)_2$ was prepared by initially combining 10.1 g (0.1 mole) of n-hexylamine, 18.9 g (0.2 mole) of chloroacetic acid and 63.14 g (0.2 mole) of barium hydroxide octahydrate in 200 ml of water and stirring for 12 hours at 50° C. The solid product was filtered, rinsed well with water and methanol and dried in vacuo to yield 30.4 g of the white powdery barium salt. The salt was slurried in 500 ml of water at 90° C. and to it were added 32 ml of 5 N sulfuric acid dropwise over a half hour period. The slurry was filtered and the filtrate concentrated to a dense semi-solid. Treatment with hot acetone caused crystallization and the white solid was collected and dried in vacuo to give 12.15 g of the ligand, m.p. 130°–131° C.

The dye developer was formed by combining 3.1 g (0.005 mole) of the 1:1 complex and 2.46 g (0.01 mole) of the ligand in 20 ml of 2-methoxyethanol and 2 ml of water with 2 g of triethylamine and warming to 90° C. for thirty minutes under a nitrogen atmosphere. To the cooled solution were added 5 g (0.018 mole) of tetra-n-butyl ammonium chloride followed by 100 ml of water. The solid dye developer was collected by filtration rinsed with water and dried in vacuo to yield 4.4 g.

$C_{56}H_{76}N_7O_8Cr$ requires 64.0% C; 7.25% H; 9.3% N and 5.1% Cr. Elemental analysis found 63.9% C; 7.2% H; 9.3% N and 4.9% Cr.

Vis(meth. cell)λmax 577 nm (ε=27,600)

A film unit was prepared as follows: the negative was made by coating a 4 mil polyethylene terephthalate film base with the following layers:

1. a layer of compound II dispersed in cellulose acetate hydrogen phthalate at a coverage of 52.6 mgs/ft² (0.0512 m moles) of compound II and 52.6 mgs/ft² of cellulose acetate hydrogen phthalate;

2. a green sensitive gelatino silver iodobromo emulsion coated at a coverage of about 120 mgs/ft² of silver and about 120 mgs/ft² of gelatin;

3. a layer coated at a coverage of about 30 mgs/ft² of gelatin and about 7.5 mgs/ft² of 4'-methyl phenyl hydroquinone.

The image receiving element comprised a 4 mil polyethylene terephthalate film base with the following layers coated thereon in succession:

1. as a polymeric acid layer, a partial butyl ester of polyethylene/maleic anhydride copolymer at a coverage of about 2,450 mgs/ft²;
2. a timing layer containing about a 75:1 ratio of a 60 - 30 - 4 - 6 copolymer of butylacrylate, diacetone acrylamide, styrene and methacrylic acid and polyvinylalcohol at a coverage of about 350 mgs/ft²;
3. a polymeric image receiving layer containing a 3:1 blend of a mixture of 1 part poly-4-vinylpyridine and 2 parts polyvinylalcohol and a 2.2:2.2:1 graft copolymer of hydroxyethylcellulose, 4-vinylpyridine and vinyl benzyl trimethylammonium chloride coated at a coverage of about 300 mgs/ft².

The film unit was processed with a processing composition comprised of:

|  | (GMS/100 gm H₂O) |
|---|---|
| Titanium dioxide | 94.08 |
| Sodium carboxymethyl cellulose | 2.29 |
| Potassium hydroxide | 9.42 |
| Lithium hydroxide | 0.26 |
| N-benzyl-α-picolinium bromide | 2.81 |
| N-phenethyl-α-picolinium bromide | 1.62 |
| Benzotriazole | 1.25 |
| 5-methyl-6-bromo-azabenzimidazole | 0.06 |
| 6-methyl uracil | 0.66 |
| Lithium nitrate | 0.22 |
| Ethylene diamine tetraacetic acid | 1.86 |
| Colloidal silica | 1.23 |
| Carbowax | 1.21 |
| Bis-2-amino ethyl sulfide | 0.05 |
| N-benzylamino purine | 0.89 |

The film unit was exposed to green and blue light and then passed through a pair of rollers at a gap of about 0.0020 inches. The unit was allowed to remain in the dark for ten minutes and the maximum and minimum reflection densities were then measured. The resulting image had a $D\max/D\min = 1.18/0.33$ and the ratio of the minimum density in the blue region to the maximum density in the green region was 0.33.

EXAMPLE III

Preparation of Compound III

A solution was formed by dissolving 0.1 g (0.0001 mole) of compound II and 150 mg (0.0005 mole) of phenethyl picolinium bromide in 10 ml of methanol. This solution was added to a solution of 300 mg of phenethyl picolinium bromide in 100 ml of water. The solid was collected by filtration and dried in vacuo.

Vis(meth.cell)λmax 577 mμ (ε=25,600); 538 mμ (ε=20,400)

The dye developer was tested in the same manner described in Example II using the same processing composition and film unit with the exception that compound III was used in place of compound II. The positive image had a $D\max/D\min = 1.52/0.45$ and the ratio of the minimum density in the blue region to the maximum density in the green region was 0.33.

EXAMPLE IV

Preparation of Compound IV

The dye developer was formed by initially forming a solution of 0.2 g (0.00032 mole) of the 1:1 complex described in Example II, 0.16 g (0.00064 mole) of the ligand described in Example II and 0.14 g (0.00014 mole) of triethanolamine in 10 ml of 2-methoxyethanol. The solution was evaporated to dryness and the solid dissolved in 1 ml of methanol. To the solution were added 40 ml of saturated salt solution and the solid collected by filtration and air dried. The solid was dissolved in acetone to remove insoluble excess ligand and the solution was filtered. The solution was evaporated to dryness and the residue was crystallized from methanolhexane solution to yield a magenta solid.

Vis(meth. cell)λmax 576 mμ (ε=21,800); 537 mμ (C=17,600)

$C_{40}H_{40}N_6O_8Na$ Cr.1.5 H₂O requires 57.4% C; 5.15% H; 10.25% N; 6.35% Cr and 2.8% Na. Elemental analysis gave 57.62% C; 5.47% H; 10.00% N; 6.01% Cr and 3.13% Na.

EXAMPLE V

Preparation of Compound V

The dye developer was prepared in the same manner described above with respect to the preparation of compound II with the exception that tri-n-amylamine hydrochloride, $(C_5H_{11})_3$ NHCl, was used in place of the tetra-n-butyl ammonium chloride.

The dye developer was tested in the same manner described in Example II using the same processing composition and the same film unit with the exception that compound V was used in place of compound II. The positive image had a $D\max/D\min = 1.74/0.54$ and the ratio of the minimum density in the blue region to the maximum density in the green region was 0.28.

EXAMPLE VI

Preparation of Compound VI

A ligand, N-(n-propyl)-iminodiacetic acid having the molecular formula $C_3H_7N$ $(CH_2COOH)_2$ was prepared according to the technique used to prepare the ligand used in Example II. The dye developer was formed in the same manner described for the preparation of compound II. The amounts of the reactants and solvents were: 1 g (0.0016 mole) of the 1:1 complex of Example II; 0.78 g (0.0045 mole) of the ligand; 1 g (0.01 mole) of triethylamine; 25 ml of 2-methoxyethanol; and 5 ml of water.

Vis(meth.cell)λmax 578 mμ (C=26,400); 640 mμ (ε=21,600)

$C_{53}H_{70}N_7O_8Cr$ requires 64.6% C; 7.2% H; 10.0% N and 5.3% Cr. Elemental analysis found 65.1% C; 7.8% H; 9.5% N and 5.0% Cr.

EXAMPLE VII

Preparation of Compound VII

A solution of 4.0 g (0.01 mole) of compound XIII and 5 g (0.05 mole) of sodium carbonate was formed and stirred and to it were added 1.96 g (0.01 mole) of

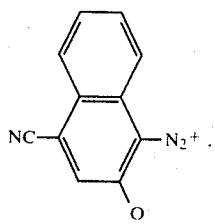

After two hours the reaction was quenched by adding the mixture to a stirred slurry of 100 ml of 10% hydrochloric acid and 100 g of ice. The orange solid was collected by filtration and rinsed with water to yield 5.8 g, m.p. 159°–160° C., on drying.

Vis(methyl cell)λmax 490 nm ($\epsilon = 24,800$), 345 nm ($\epsilon = 7,200$)

To a stirred solution of 100 g (0.04 mole) of boron tribromide in 600 ml of dry methylene chloride at −78° C. there was added dropwise a solution of 37 g (0.06 mole) of the orange solid in 500 ml of methylene chloride. The reaction mixture was stirred an additional hour at −78° C. and then 200 ml of diethyl ether were added cautiously. The volatiles were removed by purging the system with nitrogen for one hour with the cooling bath removed. The remaining slurry was quenched with 20 ml of methanol and added to a stirred slurry of 300 g of ice and 500 ml of 10% hydrochloric acid. The gummy solid was dissolved in 600 ml of ethyl acetate. The solution was washed with three 50 ml volumes of water and then with 75 ml of saturated salt solution, dried over calcium sulfate and concentrated in vacuo to yield 25 g of an orange solid, m.p. 205°–206° C.

Vis(methyl cell)λmax 490 nm ($\epsilon = 26,400$)

10 g (0.023 mole) of the orange solid and 12.4 g (0.046 mole) of chromium trichloride hexahydrate were combined in 30 ml of 2-methoxyethanol and heated at 90° C. for 12 hours. The solution was cooled, diluted with saturated salt solution and the product collected by filtration. The magenta solid was rinsed with water and air dried to yield 12.0 g of the 1:1 chromium complex.

Five drops of triethylamine, 0.1 g (0.00019 mole) of the chromium complex and 0.1 g (0.0005 mole) of the ligand described in Example II were combined in 10 ml of 2-methoxyethanol and warmed to 90° C. for a half hour. To the cooled solution there was added 0.2 g of tetra-n-butyl ammonium chloride. Dilution with 50 ml of water caused the dye developer to precipitate. The product was collected by filtration, rinsed with water and dried in vacuo to yield 0.19 g.

Vis(meth. cell)λmax 574 (qual.)

EXAMPLE VIII

Preparation of Compound VIII

Compound VIII was prepared in the same manner described for the preparation of Compound II. The amounts of the reactants and solvents were: 0.25 g (0.0004 mole) of the 1:1 complex described in Example II; 0.11 g (0.0008 mole) of iminodiacetic acid; 0.16 g (0.0016 mole) of triethylamine; 10 ml of 2-methoxyethanol; 5 ml of water; and approximately 5 g of tetra-n-butyl ammonium chloride.

Vis(meth.cell)λmax 575 nm ($\epsilon = 26,400$); 536 nm ($\epsilon = 22,00$).

$C_{50}H_{64}N_7O_8Cr \cdot H_2O$ requires 62.4% C; 6.9% H; 10.1% N; 5.4% Cr. Elemental analysis found 62.6% C; 7.2% H; 9.6% N and 5.8% Cr.

The dye developer was tested in the same manner described in Example II using the same processing composition and the same film unit with the exception that compound VIII was used in place of compound II. The positive image had a $D_{max}/D_{min} = 1.97/1.11$ and the ratio of the minimum density in the blue region to the maximum density in the green region was 0.29.

EXAMPLE IX

Preparation of Compound IX

To a stirred solution of 8 g (0.02 mole) of compound XIII and 10 g (0.1 mole) of sodium carbonate in 200 ml of acetone and 100 ml of water were added 5.8 g (0.02 mole) of

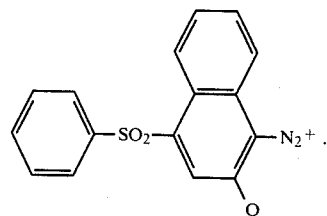

The solution was stirred for two hours at room temperature. The reaction was quenched at 0° C. by adding it to a stirred slurry of 100 ml of 10% hydrochloric acid and 100 g of ice. The orange solid was collected by filtration and rinsed with water to yield 13 g on drying, m.p. 175°–176° C.

Vis(meth cell)λmax 498 nm ($\epsilon = 22,000$)

To a stirred solution of 6.25 g (0.025 mole) of boron tribromide in 100 ml of dry methlene chloride at −78° C. there was added dropwise a solution of 3.5 g (0.005 mole) of the previous product in 300 ml of methylene chloride. The reaction mixture was stirred for one hour at −78° C. and then purged with nitrogen for one hour to remove excess reagent. Then 50 ml of ethyl ether was added cautiously and the slurry added to a stirred slurry of ice and 10% hydrochloric acid. The organic layer was washed with water, dried over calcium sulfate and concentrated on a steam bath to cause precipitation. The solid was collected by filtration and dried in vacuo to yield 2 g. m.p. 215°–216° C. (dec.).

Vis(meth cell)λmax 498 nm ($\epsilon = 21,600$).

A 1:1 chromium complex was formed by combining 0.2 g (0.0039 mole) of the previous product and 0.3 g (0.0011 mole) of chromium trichloride hexahydrate in 5 ml of 2-methoxyethanol and heating to 90° C. for twelve hours. The cooled solution was partitioned between saturated salt solution and ethyl acetate. The organic phase was washed with brine and dried over calcium sulfate. Solvent removal gave 0.25 g of a magenta solid.

The dye developer was formed by combining 5 drops of triethylamine, 0.1 g (0.00019 mole) of the 1:1 complex and 0.1 g (0.0005 mole) of the ligand described in Example II (which was used in the preparation of compound II) in 10 ml of 2-methoxyethanol and warming to 90° C. for a half hour. The cooled solution was diluted with 30 ml of water, acidified with dilute hydrochloric acid and the solid collected by filtration. The magenta solid was dried in vacuo to yield 0.15 g.

Vis(meth cell)λmax 574 nm; 538 nm (qual).

EXAMPLE X

Preparation of Compound X

A hydrazine intermediate was prepared according to the following reaction:

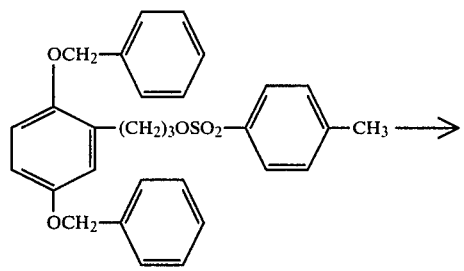

(XV)

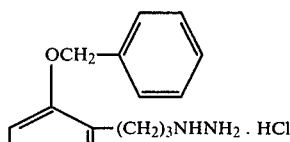

(XVI)

To a refluxing solution of 117 g of 95% H₂NNH₂ and 13.5 g of water in 400 ml absolute ethanol was added with stirring under nitrogen a solution of 90.45 g (0.18 mole) of compound (XV) in 340 ml diethyl ether and 400 ml absolute ethanol over a period of 5½ hours. The solution was then refluxed for an additional half hour. The reaction mixture was evaporated in vacuo. Water was added to the residue and then extracted twice with ether. The ether extracts were washed twice with water, dried over anhydrous sodium sulfate, the sodium sulfate filtered off and to the ether filtrate was added with stirring a solution of ether saturated with hydrogen chloride gas until no more precipitation occurred. The precipitate was filtered, washed with ether and dried to give 60 g of solid which was then recrystallized from 450 ml of isopropanol to yield 52 g of a white solid.

A pyrazolone intermediate having the structural formula:

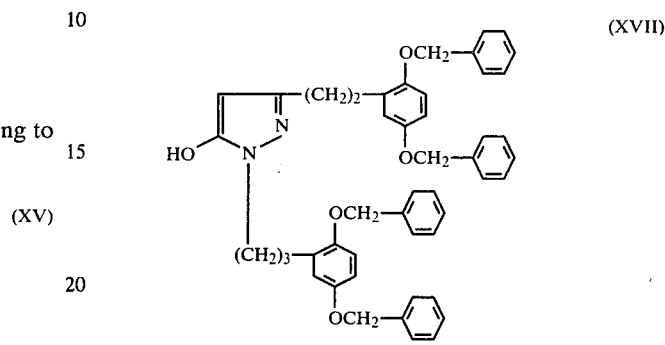

(XVII)

was prepared by initially forming a mixture of 1 g (0.0023 mole) of compound (XVI) and 0.377 g (0.0046 mole) of sodium acetate in 30 ml of absolute ethanol and stirring at room temperature for several minutes. Then 1.1 g (0.00254 mole) of compound (XII) was added and the mixture stirred for 1½ hours. The solid which formed was filtered, washed with ethanol and then with water and dried to give 1.35 g of a white solid, m.p. 93°–95° C.

A compound having the structural formula:

(XVIII)

was prepared by initially forming a mixture of 36.5 g (0.05 mole) of compound (XVII) and 15.5 g (0.05 mole) of a compound having the structural formula:

(XIX)

in 500 ml of acetone. There was then added to the mixture with stirring a solution of 8.4 g (0.1 mole) of sodium hydrogen carbonate in 250 ml of water. The mixture was stirred at room temperature for two hours, poured into 125 ml of concentrated hydrogen chloride water and ice, filtered, washed well with water and dried to provide 48.7 g of solid (compound XVIII).

To a solution of 88.55 g of boron tribromide in 800 ml of methylene chloride cooled to −78° C. and under nitrogen was added, dropwise and with stirring, a solution of 46 g (0.0442 mole) of compound XVIII in 400 ml of methylene chloride over a period of two hours. The solution was stirred for an additional half hour at −78° C. Ether was added twice and by warming to room temperature, evaporated to dryness with nitrogen. The residue was triturated with ether, filtered, washed with ether and dried. It was then dissolved in warm methanol and evaporated in vacuo to dryness to yield 30 g.

A mixture of 30 g (0.044 mole) of the previous product and 42 g (0.157 mole) of chromium chloride hexahydrate in 300 ml of deaerated methyl cellosolve was refluxed under nitrogen for two hours. The reaction was cooled, poured into a saturated salt and ice solution. The water was then decanted from the precipitated gummy material. To this was added salt solution and it was triturated until a solid was obtained. The solid was filtered, washed with cold water and dried to yield 31 g of the 1:1 chrome complex having the structure

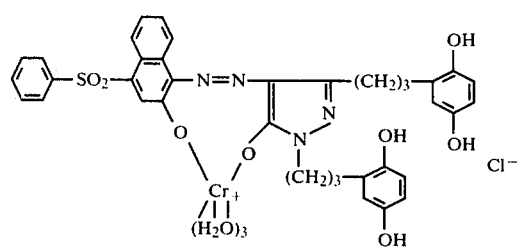

XX

A solution of 45 g. (0.05 m) of compound XX in 450 ml. of 2-methoxyethanol was formed and deaerated by bubbling nitrogen through it for 15 minutes. A deaerated solution of 23 g. (0.1 m) of N-hexyliminodiacetic acid in 50 ml. of 2-methoxyethanol was added to the solution of the chrome complex followed by 37 g. (0.2 m) of tri-n-butyl amine. The solution was warmed to 90° C. for about ½ hour and then cooled to ambient temperature. The cooled solution was added to 1½ liters of deaerated water with rapid stirring. The The resulting solid was collected by filtration, washed three times with 500 ml. of warm, deaerated water (slurried and refiltered each time) and dried in vacuo. The dried solid was slurried in 1.4 liters of diethyl ether for 12 hours under nitrogen. The solid was collected by filtration and dried in vacuo to yield 54 g. (82% yield) of a magenta solid (compound X).

$C_{58}H_{75}N_6SO_{12}$ Cr requires 61.54% C, 6.62% H, 7.43% N, 2.83% S and 4.6% Cr. Elemental analysis found 61.53% C, 6.97% H, 7.29% N, 2.54% S and 4.63% Cr.

Vis(meth. cell.) $\lambda_{max}$575 nm ($\epsilon$=22,200); 520 nm ($\epsilon$=19,200).

Although the invention has been described in detail with respect to various embodiments thereof, these are intended to be illustrative only and not limiting of the invention but rather those skilled in the art will recognize that modifications and variations may be made therein which are within the spirit of the invention and the scope of the appended claims.

What is claimed is:

1. A photographic film unit which comprises a support carrying a photosensitive silver halide emulsion layer associated with a dye developer which is represented by the structural formula:

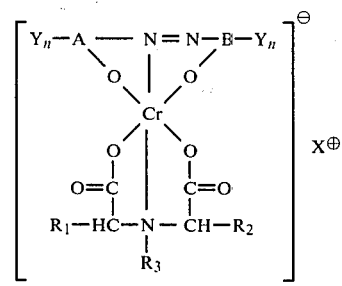

wherein A is a radical of benzene or naphthalene; B is a radical of benzene or naphthalene or a nitrogen-containing heterocyclic radical; Y is a silver halide developing substituent; X is a photographically acceptable cation; each n is 0, 1 or 2 with the proviso that at least one n is 1; $R_1$ and $R_2$ are H or when taken together represent the carbon atoms necessary to complete a five or six member heterocyclic moiety; and $R_3$ is H or alkyl having from 1 to 6 carbon atoms.

2. A photographic film unit as defined in claim 1 wherein said dye developer is represented by the structural formula:

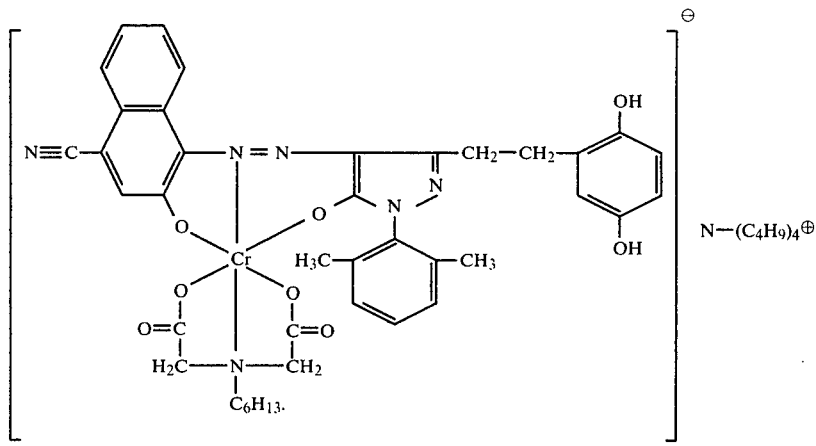
3. A photographic film unit as defined in claim 1 wherein said dye developer is represented by the structural formula:
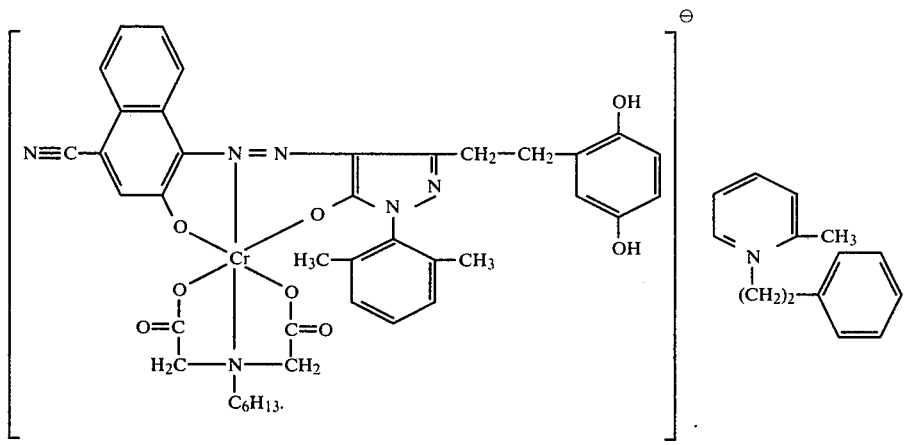
4. A photographic film unit as defined in claim 1 wherein said dye developer is represented by the structural formula:
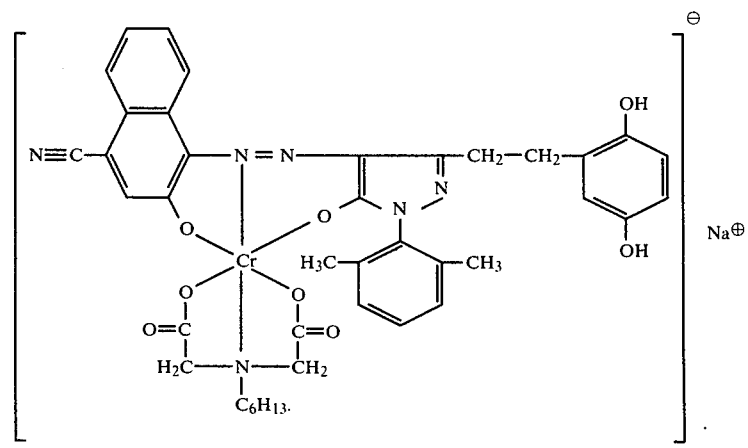
5. A photographic film unit as defined in claim 1 wherein said dye developer is represented by the structural formula:

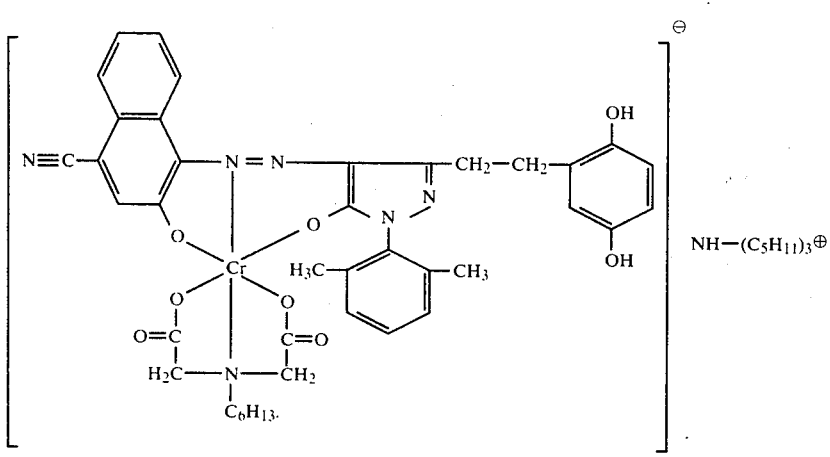
6. A photographic film unit as defined in claim 1 wherein said dye developer is represented by the structural formula:
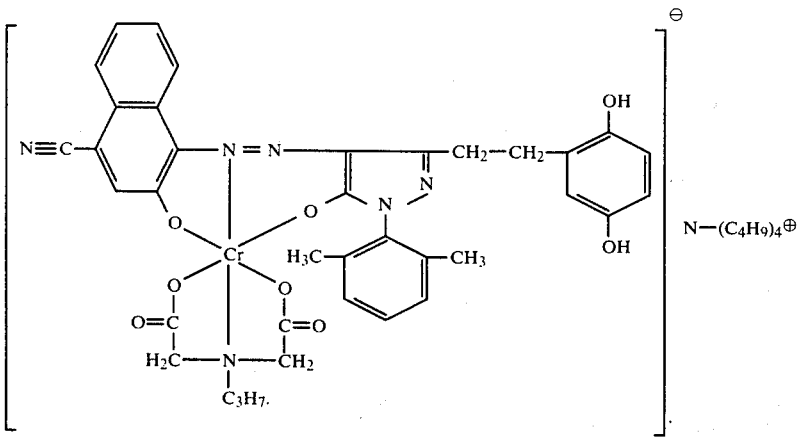
7. A photographic film unit as defined in claim 1 wherein said dye developer is represented by the structural formula:
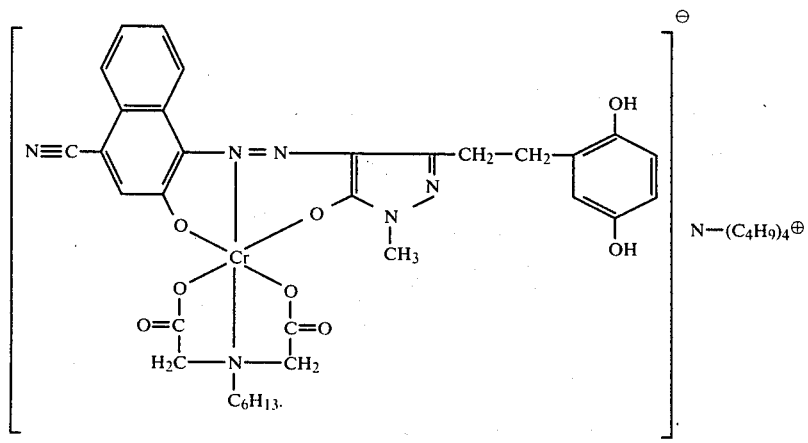
8. A photographic film unit as defined in claim 1 wherein said dye developer is represented by the structural formula:

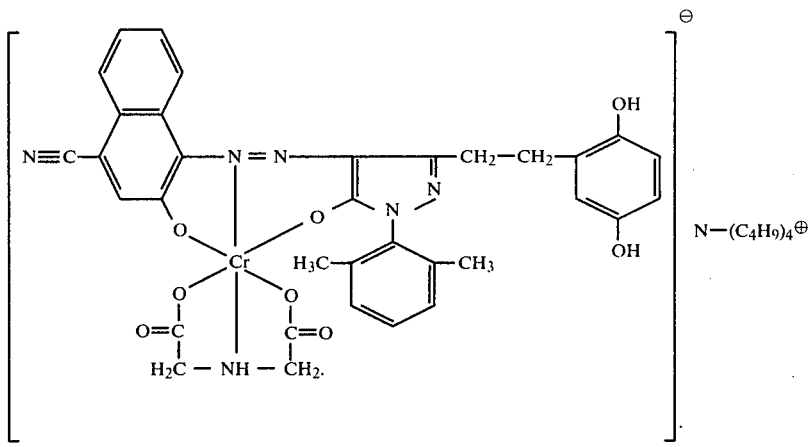

9. A photographic film unit as defined in claim 1 wherein said dye developer is represented by the structural formula:

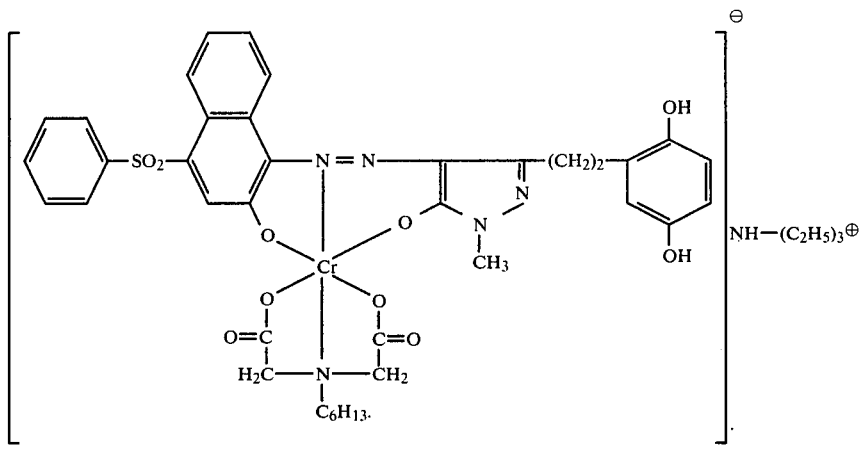

10. A photographic film unit as defined in claim 1 wherein said dye developer is represented by the structural formula

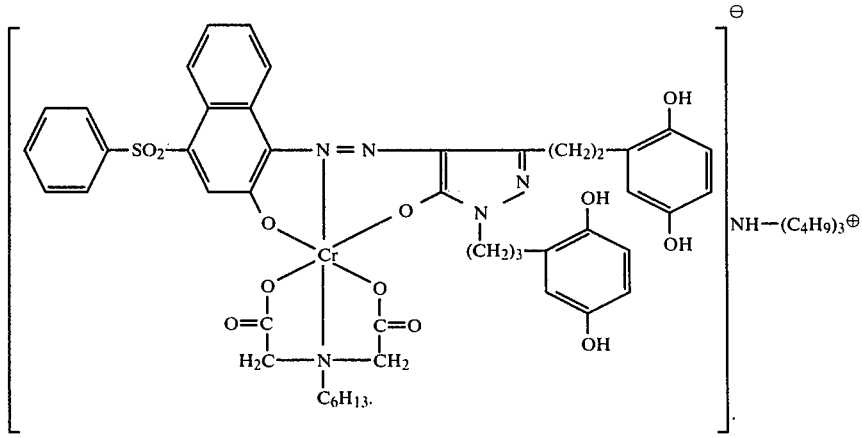

11. A photographic film unit comprising a first support and a second support, at least one of said supports being transparent; a plurality of layers including at least one photosensitive silver halide emulsion layer associated with a dye developer layer carried on one of said supports; an image receiving layer carried on one of said supports; a rupturable container releasably holding a processing composition adapted, when distributed between a pair of predetermined layers carried by said supports, to develop said photosensitive silver halide emulsion layers and provide a diffusion transfer image in said image receiving layer; means providing a white light-reflecting layer between said image receiving layer and said silver halide emulsion layer(s) to mask said silver halide emulsion layers after development thereof and to provide a white background for a diffusion transfer image formed in said image receiving layer, said diffusion transfer image being viewable through said transparent support; said supports and the layers carried thereon being held in fixed relationship with said photosensitive silver halide emulsion layer(s) being photoexposable through a transparent support, one of said dye developer layer(s) comprising a dye developer which is represented by the structural formula:

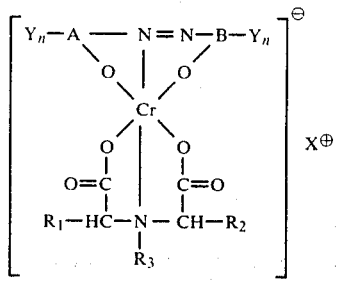

wherein A is a radical of benzene or naphthalene; B is a radical of benzene or naphthalene or a nitrogen-containing heterocyclic radical; Y is a silver halide developing substituent; X is a photographically acceptable cation; each n is 0, 1 or 2 with the proviso that at least one n is 1; $R_1$ and $R_2$ are H or when taken together represent the carbon atoms necessary to complete a five or six member heterocyclic moiety; and $R_3$ is H or alkyl having from 1 to 6 carbon atoms.

12. A film unit as defined in claim 11 wherein said image receiving layer is carried by said transparent support, said processing composition includes a white pigment and said rupturable container is so positioned as to distribute its contents between said image receiving layer and said one of said silver halide emulsion layer(s).

13. A film unit as defined in claim 11 wherein both said supports are transparent, said image receiving layer and said silver halide emulsion layer(s) are carried by the same support with a layer of white pigment therebetween, and said rupturable container is so positioned as to distribute its contents between one of said silver halide emulsion layer(s) and the transparent support through which photoexposure is effected.

14. A film unit as defined in claim 11 wherein said dye developer is represented by the structural formula:

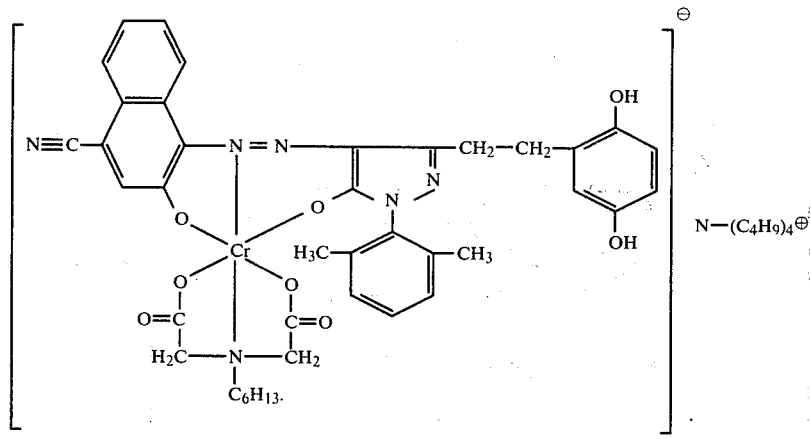

15. A film unit as defined in claim 11 wherein said dye developer is represented by the structural formula:

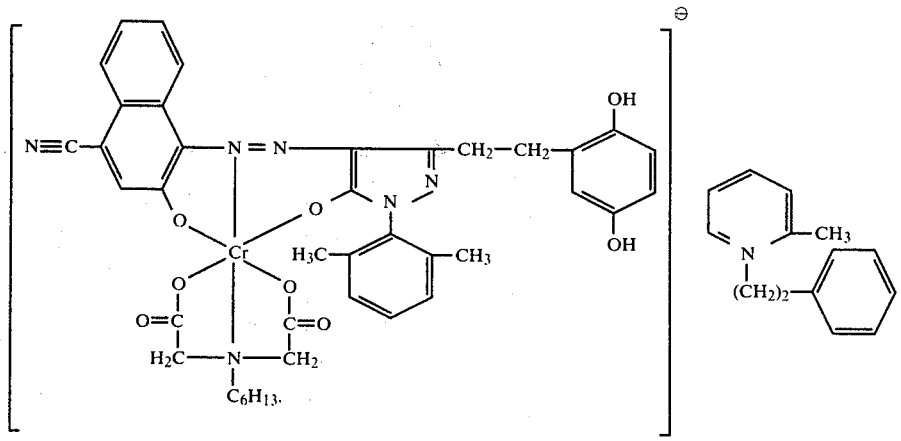

16. A film unit as defined in claim 11 wherein said dye developer is represented by the structural formula:

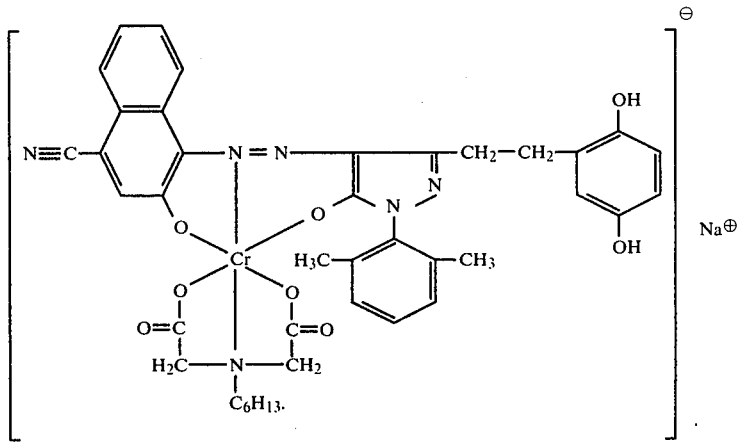
17. A film unit as defined in claim 11 wherein said dye developer is represented by the structural formula:
18. A film unit as defined in claim 11 wherein said dye developer is represented by the structural formula:
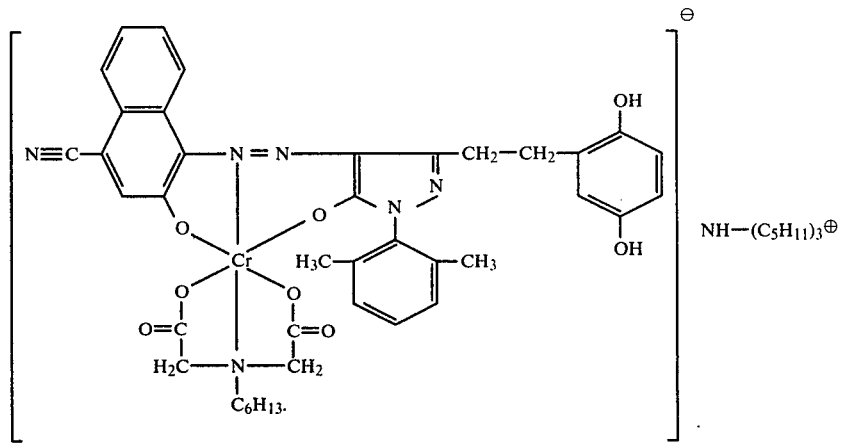
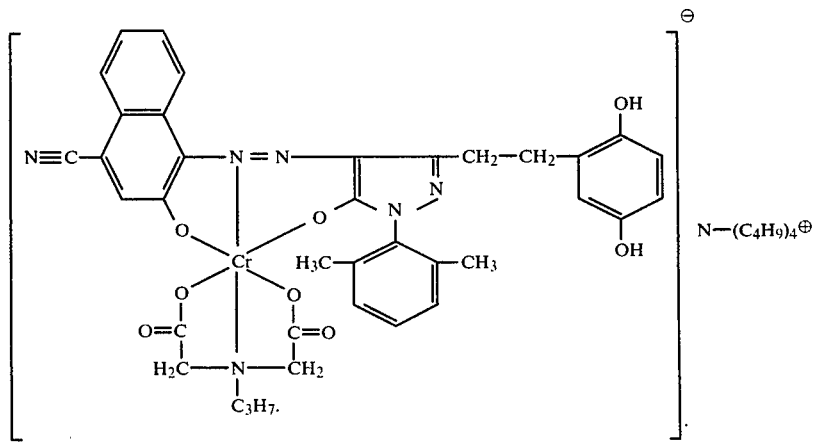
19. A film unit as defined in claim 11 wherein said dye developer is represented by the structural formula:

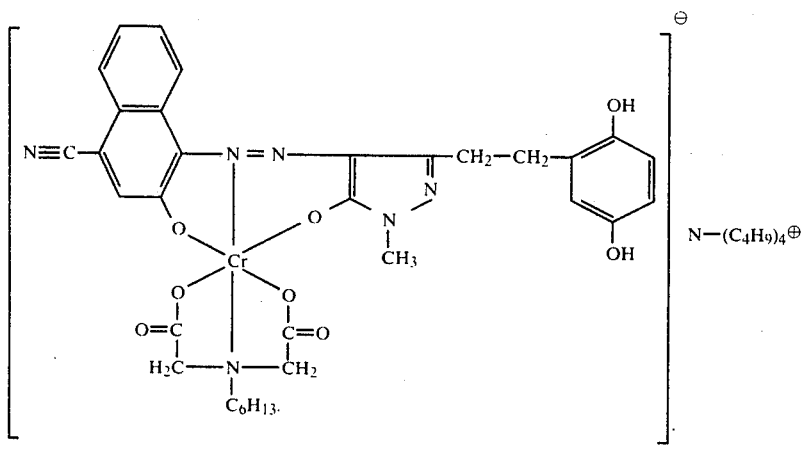
20. A film unit as defined in claim 11 wherein said dye developer is represented by the structural formula:
21. A film unit as defined in claim 11 wherein said dye developer is represented by the structural formula:
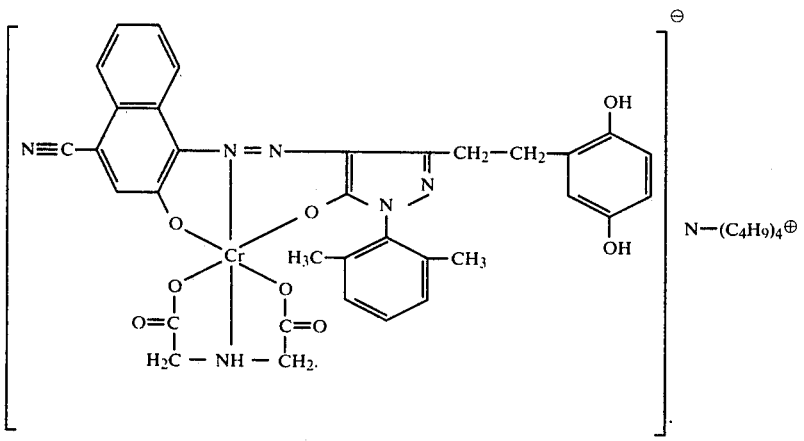
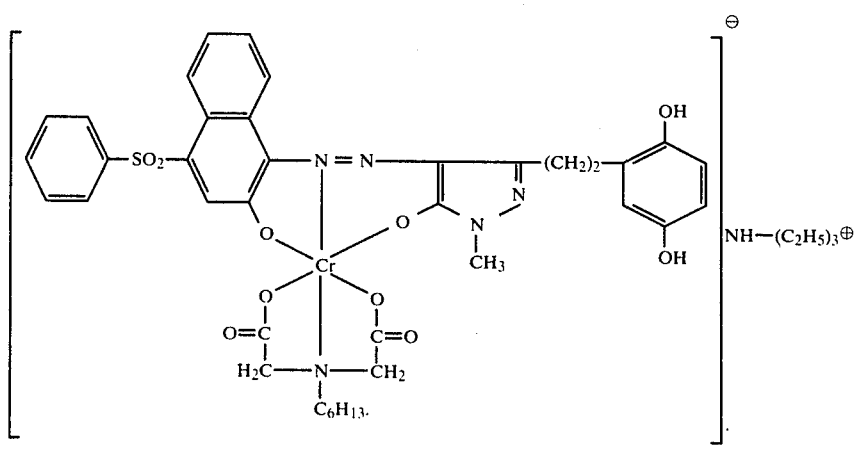
22. A film unit as defined in claim 11 wherein said dye developer is represented by the structural formula

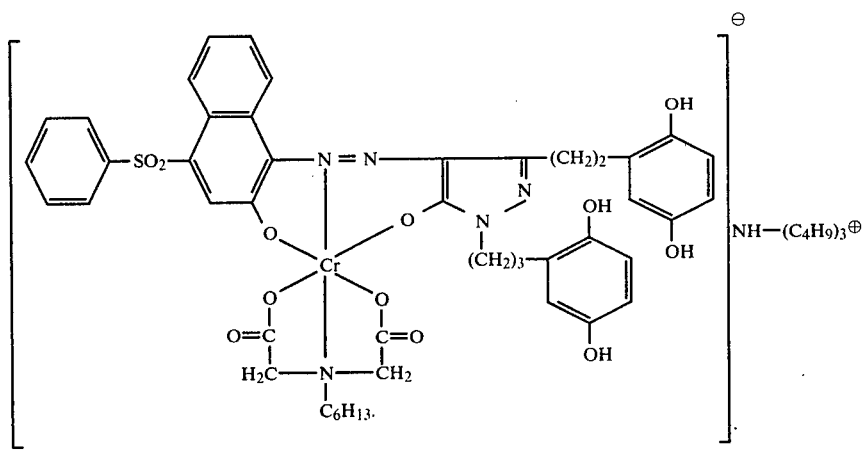

Disclaimer

4,267,253.—*Elbert M. Idelson,* West Newton, Mass. CHROME COMPLEXED MAGENTA DYE DEVELOPERS. Patent dated May 12, 1981. Disclaimer filed Nov. 28, 1983, by the assignee, *Polaroid Corp.*

Hereby enters this disclaimer to claims 1–22 of said patent.
[*Official Gazette January 17, 1984.*]